US011507146B2

United States Patent
Kennedy et al.

(10) Patent No.: US 11,507,146 B2
(45) Date of Patent: Nov. 22, 2022

(54) SYSTEM AND METHOD OF DETERMINING CHASSIS IDENTIFICATIONS FOR INFORMATION HANDLING SYSTEMS

(71) Applicant: Dell Products L.P., Round Rock, TX (US)

(72) Inventors: Jeffrey Leighton Kennedy, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 16/437,557

(22) Filed: Jun. 11, 2019

(65) Prior Publication Data

US 2020/0393875 A1 Dec. 17, 2020

(51) Int. Cl.
*G06F 1/18* (2006.01)
*G06F 21/86* (2013.01)
*G06F 11/30* (2006.01)
*G06F 1/32* (2019.01)

(52) U.S. Cl.
CPC ............. *G06F 1/18* (2013.01); *G06F 21/86* (2013.01)

(58) Field of Classification Search
CPC . G06F 1/18; G06F 21/86; G06F 21/73; G06F 1/181; G06F 11/3041; G06F 1/3296; G06F 11/3438; G06F 1/3215
See application file for complete search history.

(56) References Cited

U.S. PATENT DOCUMENTS

| 10,339,024 | B2 * | 7/2019 | White | G06F 11/3051 |
| 2017/0116103 | A1 * | 4/2017 | Cencini | H04L 67/1042 |
| 2019/0116480 | A1 * | 4/2019 | Schultz | H04W 8/005 |
| 2019/0371139 | A1 * | 12/2019 | Engler | G08B 25/008 |

FOREIGN PATENT DOCUMENTS

JP 2014197763 A * 10/2014

OTHER PUBLICATIONS

"Unique Device Identification System"—IMDRF, Jul. 12, 2018 https://www.imdrf.org/sites/default/files/2021-09/imdrf-cons-udi-system-n48-180712.pdf (Year: 2018).*
"Wireless Device Identification Using Oscillator Control Voltage as RF Fingerprint"—Azarmehr et al., Department of Electrical and Computer Engineering, University of Windsor, May 3, 2017 https://ieeexplore.IEEE.org/document/7946820 (Year: 2017).*

* cited by examiner

*Primary Examiner* — Randy A Scott
(74) *Attorney, Agent, or Firm* — McDermott Will & Emery LLP

(57) ABSTRACT

In one or more embodiments, one or more systems, methods, and/or processes may determine that a switch of an information handling system has been actuated; may provide, via a conductor of the switch, an electric charge to an element of a lid portion of a chassis of the information handling system; after providing the electric charge to the element of the lid portion of the chassis, may determine that an amount of time has transpired; in response to determining that the amount of time has transpired, may determine a voltage value associated with the element of the lid portion of the chassis; may determine an identification of the chassis based at least on the voltage value; and may configure at least a portion of the information handling system based at least on the identification of the chassis.

20 Claims, 14 Drawing Sheets

SYSTEM AND METHOD OF DETERMINING CHASSIS IDENTIFICATIONS FOR INFORMATION HANDLING SYSTEMS

BACKGROUND

Field of the Disclosure

This disclosure relates generally to information handling systems and more particularly to determining chassis identification for information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine that a switch has been actuated; may provide, via a conductor of the switch, an electric charge to an element of a lid portion of a chassis of an information handling system; after providing the electric charge to the element of the lid portion of the chassis, may determine that an amount of time has transpired; in response to determining that the amount of time has transpired, may determine a voltage value associated with the element of the lid portion of the chassis; may determine an identification of the chassis based at least on the voltage value; and may configure at least a portion of the information handling system based at least on the identification of the chassis.

In one or more embodiments, the element of the lid portion of the chassis may be separated from the lid portion of the chassis by a dielectric. In one or more embodiments, the switch may be an intrusion detection switch. In one or more embodiments, the one or more systems, methods, and/or processes may further determine, based at least on the voltage, a capacitance value associated with the element of the lid portion of a chassis. In one or more embodiments, determining the identification of the chassis based at least on the voltage value may be further based at least on the capacitance value. In one or more embodiments, determining the capacitance value based at least on the voltage value may be further based at least on the amount of time has transpired.

In one or more embodiments, the one or more systems, methods, and/or processes may further determine an inventory of one or more components of the information handling system based at least on the identification of the chassis. For example, configuring the at least the portion of the information handling system may include configuring the information handling system to utilize the one or more components of the information handling system. In one or more embodiments, the one or more systems, methods, and/or processes may further configure the one or more components of the information handling system. In one or more embodiments, the one or more systems, methods, and/or processes may further discharge the element of the lid portion to discharge for the amount of time.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
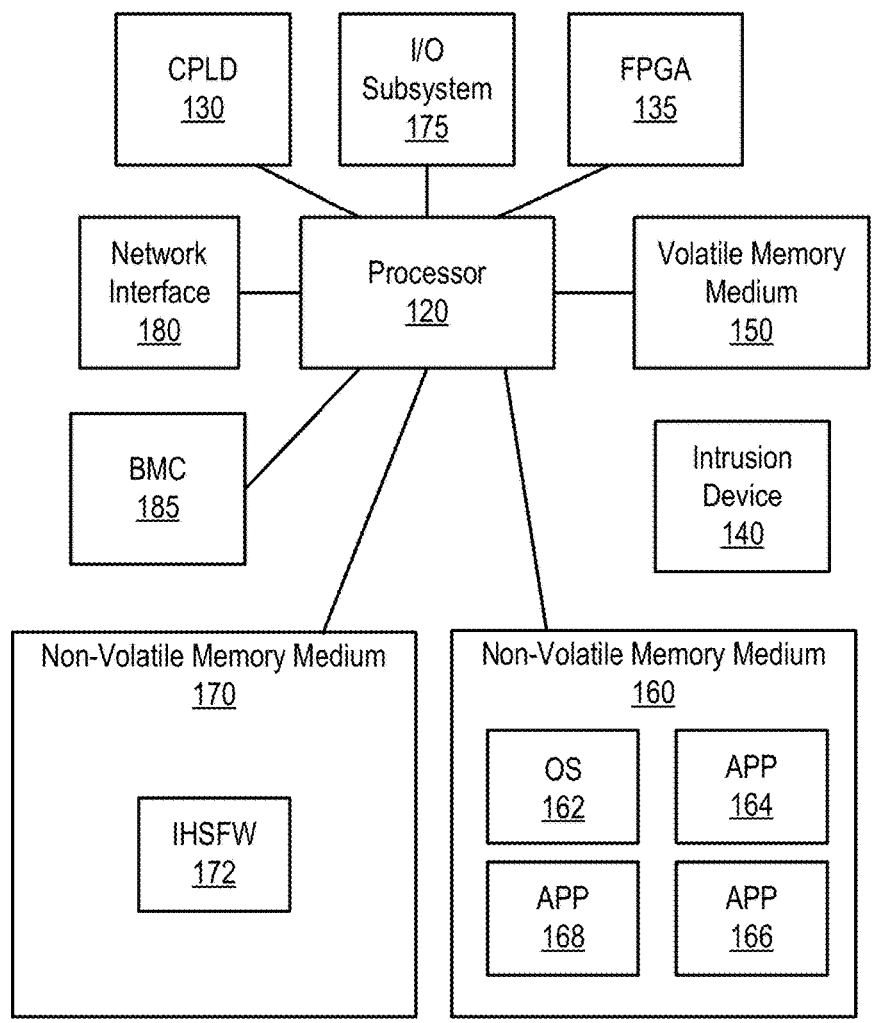
FIGS. 1A and 1B illustrate an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a planar may be utilized in multiple chassis of information handling systems. In one example, a planar may be or include a motherboard of an information handling system. In another example, a planar may be or include a logic board of an information handling system. In one or more embodiments, a planar may be associated with multiples types. In one example, the planar may be associated with a first type when the planar is installed in a first chassis or a first enclosure configuration. In another example, the planar may be associated with a second type when the planar is installed in a second chassis or a second enclosure configuration. In one instance, the second chassis may be different from the first chassis. In another instance, the second enclosure configuration may be different from the first enclosure configuration.

In one or more embodiments, one or more portions of an information handling system may utilize a chassis configuration. In one example, a portion of the information handling system that may utilize the chassis configuration may be or include a complex logic device (CPLD). In a second example, a portion of the information handling system that may utilize the chassis configuration may be or include a field programmable gate array (FPGA). In another example, a portion of the information handling system that may utilize the chassis configuration may be or include firmware (FW). In one instance, the firmware may be or include information handling system firmware. In another instance, the firmware may be or include firmware of a device or a component of the information handling system.

In one or more embodiments, a chassis configuration may be determined via a chassis identification (ID). In one example, a chassis ID may be determined via one or more pogo pins. For instance, a pattern of pogo pins may be utilized in determining a chassis ID. In another example, a chassis ID may be determined via a non-volatile memory medium (e.g., EEPROM, EPROM, etc.). For instance, the non-volatile memory medium may store and/or provide the chassis ID.

In one or more embodiments, a chassis intrusion device may include one or more switches. In one example, a switch of a chassis intrusion device may be normally open. In another example, a switch of a chassis intrusion device may be normally closed. In one or more embodiments, a switch of a chassis intrusion device may be normally open when the chassis intrusion device is in contact with a lid portion of a chassis of an information handling system. In one or more embodiments, a metal contact of the chassis intrusion device may conduct electric charge to a passive element that may be included by the lid portion of the chassis of the information handling system. For example, the passive element may be or include a portion of a capacitor. For instance, the passive element may be or include a conductor.

In one or more embodiments, circuitry may provide an electric charge to the passive element. In one or more embodiments, the circuitry may determine one or more discharges of the passive element. For example, after the passive element is electrically charged, the circuitry may determine one or more discharges of the passive element at one or more respective times. For instance, a discharge of the passive element may be measured in volts. In one or more embodiments, multiple passive elements may be utilized with respective multiple chassis. In one example, a first passive element may be utilized with a first chassis. In another example, a second passive element may be utilized with a second chassis. In one instance, the second passive element may different from the first passive element. In another instance, the second chassis may be different from the first chassis.

In one or more embodiments, a first passive element may differ from a second passive element in capacitance. In one example, the first passive element may be associated with a first capacitance. In another example, the second passive element may be associated with a second capacitance. For instance, the second capacitance may be different from the first capacitance. In one or more embodiments, capacitance may be or include a ratio of change in an electric charge of a system to a corresponding change in electric potential of the system.

In one or more embodiments, capacitance may be or include self capacitance. For example, an object that may be electrically charged may exhibit self capacitance. For instance, an object with a large self capacitance holds more electric charge at a voltage than another object with low capacitance. In one or more embodiments, capacitance may be or include mutual capacitance.

In one or more embodiments, capacitance may be associated with one or more geometries of a design. In one example, a geometry of the design may be or include an area of a conductor (e.g., a conducting plate). In another example, a geometry of the design may be or include a distance between two conductors (e.g., a distance between two conducting plates). In one or more embodiments, capacitance may be associated with a permittivity. For example, capacitance may be associated with a permittivity between two conductors (e.g., a permittivity between two conducting plates). In one or more embodiments, capacitance may be measured in farads. For example, capacitance may be equal to and/or defined as charge per volts.

In one or more embodiments, an electric charge may be provided to an element of a lid portion of a chassis of an information handling system via a conductor of an intrusion detection switch of the information handling system. For example, circuitry may provide an electric charge to a passive element of the lid portion of the chassis. For instance, one or more of a CPLD, a FPGA, and a baseboard management controller may include the circuitry.

In one or more embodiments, the element of the lid portion of the chassis of the information handling system may be permitted to discharge. For example, permitting the element of the lid portion of the chassis of the information handling system to discharge may include discharging the element of the lid portion for an amount of time. A voltage value associated with the element of the lid portion of the chassis may be determined, after an amount of time, according to one or more embodiments. For example, the circuitry may determine the voltage value associated with the element of the lid portion of the chassis. In one or more embodiments, a capacitance value associated with the element of the lid portion of a chassis may be determined based at least on the voltage value associated with the element of the lid portion of the chassis. For example, a capacitance value associated with the passive element may be determined based at least on the voltage value associated with the passive element.

In one or more embodiments, an identification of the chassis may be determined based at least on the voltage value. In one or more embodiments, a data structure may include multiple voltage values and respectively associated chassis identifications. For example, the data structure may include a lookup table that may include the multiple voltage values and the respectively associated chassis identifications. In one or more embodiments, the identification of the chassis may be determined based at least on the capacitance value. For example, determining the identification of the chassis based at least on the voltage value may be further based at least on the capacitance value. In one or more embodiments, the chassis ID may be utilized in determining a branding of the information handling system, one or more thermal tables, one or more bay numberings, and/or one or more slot numberings, among others.

In one or more embodiments, utilizing the element of the lid portion (e.g., a passive element) to determine a chassis ID may provide one or more advantage over utilizing pogo pins and/or utilizing an EEPROM. In one example, a pogo pin may become bent. In a second example, a spring element of a pogo pin may become worn. In another example, an EEPROM may be required to be configured with a chassis ID. For instance, an EEPROM programmer may be required to program an EEPROM with a chassis ID. In one or more embodiments, a passive element may be selected and applied to a lid portion of a chassis. For example, a passive element may be selected and applied to a lid portion of a chassis during a manufacturing process. For instance, the passive element may not be required to be programmed by an electronic programmer (e.g., an EEPROM programmer).

In one or more embodiments, the information handling system may be configured based at least on the identification of the chassis. In one example, power distribution within the information handling system may be configured based at least on the identification of the chassis. In a second example, a thermal profile of the information handling system may be configured based at least on the identification of the chassis. In a third example, the information handling system may be configured to display branding information based at least on the identification of the chassis. In another example, one or more thermal tables of the information handling system may be configured based at least on the identification of the chassis.

Figure 1B:
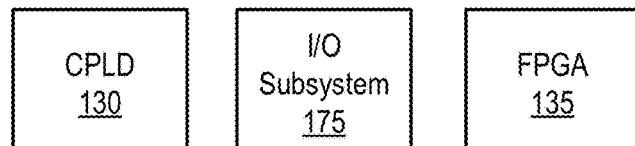

Turning now to FIGS. 1A and 1B, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include a chassis 115. In one or more embodiments, chassis 115 may be or include an enclosure of IHS 110. In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a CPLD 130, a FPGA 135, an intrusion device 140, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, and network interface 180 may be communicatively coupled to processor 120.

In one or more embodiments, one or more of CPLD 130, FPGA 135, intrusion device 140, volatile memory medium 150, non-volatile memory media 160 and 170, I/O subsystem 175, network interface 180, and BMC 185, among others, may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and BMC 185, among others, may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated). In one or more embodiments, a CPLD may include one or more structures and/or one or more functionalities of a FPGA and/or one or more structures and/or one or more functionalities of a programmable array logic (PAL), among others In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor.

In one or more embodiments, BMC 185 may be or include one or more of a FPGA and an ASIC, among others, configured, coded, and/or encoded with instructions in accordance with at least a portion of one or more of systems, one or more flowcharts, one or more methods, and/or one or more processes described herein. In one or more embodiments, one or more of CPLD 130, FPGA 135, and BMC 185, among others, may be configured, programmed, coded, and/or encoded with instructions in accordance with at least a portion of one or more of systems, one or more flowcharts, one or more methods, and/or one or more processes described herein.

As illustrated in FIG. 1B, IHS 110 may include a planar 117. In one or more embodiments, planar 117 may be or include a motherboard. In one or more embodiments, planar 117 may be or include a logic board. In one or more embodiments, one or more components of IHS 110 may be coupled to and/or mounted on planar 117. In one or more embodiments, one or more components of IHS 110 may be mounted on or in chassis 115 but may not be coupled to and/or mounted on planar 117. For example, intrusion device 140 may be mounted on or in chassis 115 but may not be coupled to and/or mounted on planar 117. Although FIG. 1B illustrates non-volatile memory medium 160 as coupled to and/or mounted on planar 117, non-volatile memory medium 160 may be mounted on or in chassis 115 but may not be coupled to and/or mounted on planar 117, according to one or more embodiments.

Figure 2:
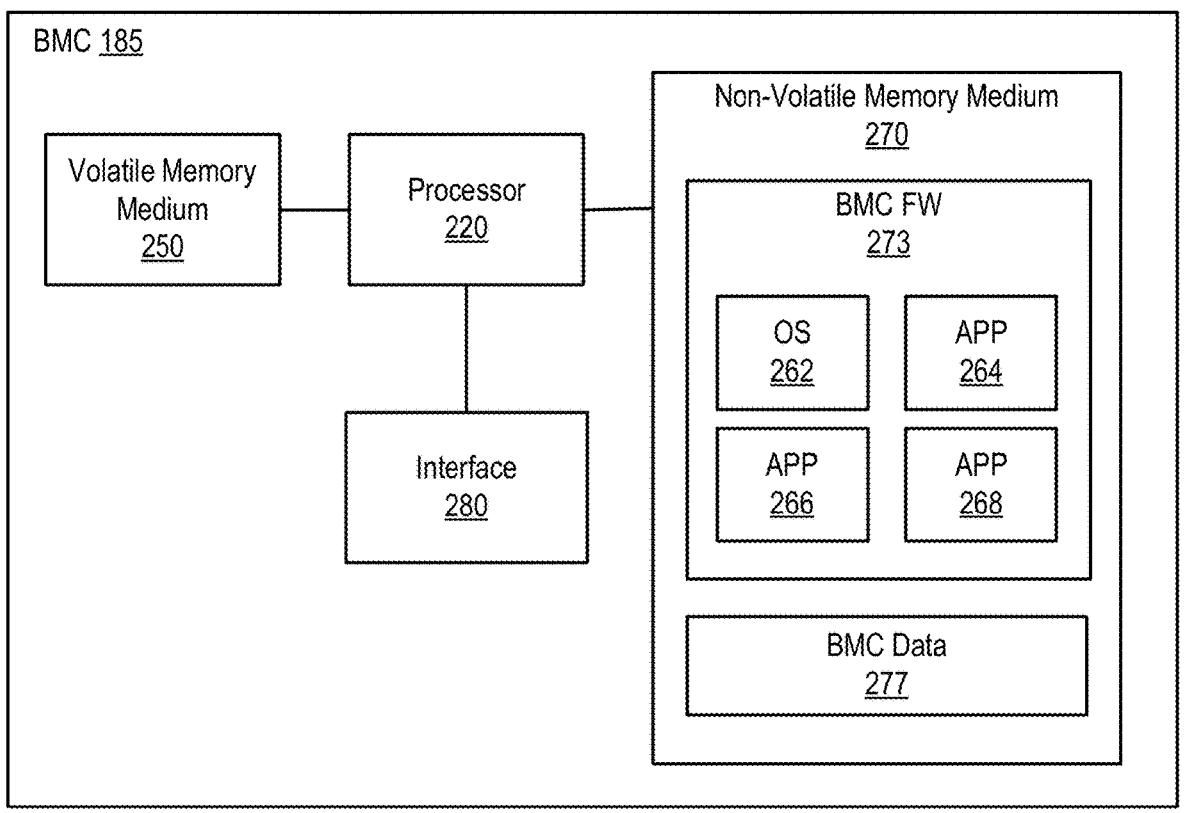
FIG. 2 illustrates an example of a baseboard management controller, according to one or more embodiments.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include Linux, FreeBSD, NetBSD, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 260 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250. Although BMC 185 is illustrated with one processor 220, BMC 185 may include multiple processors 220, according to one or more embodiments.

Figure 3A:
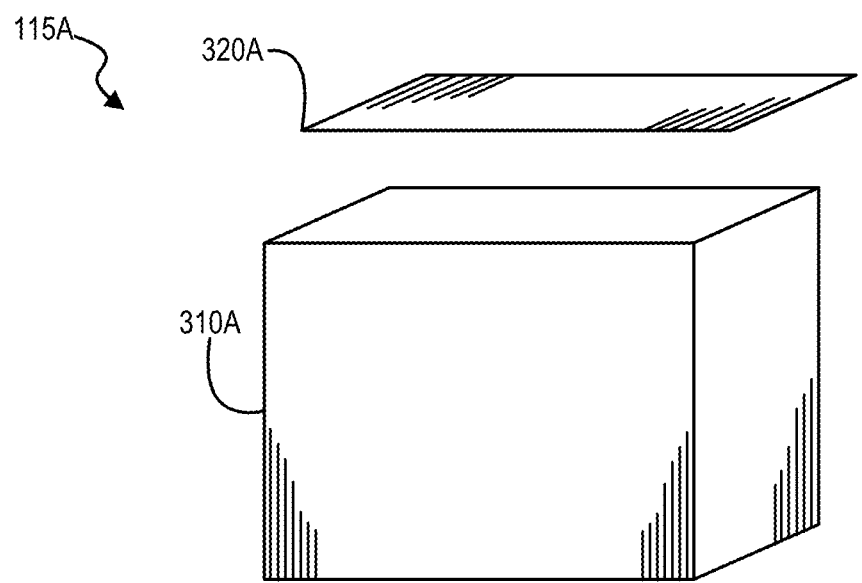
FIGS. 3A and 3B illustrate examples of chassis, according to one or more embodiments.
Figure 3B:
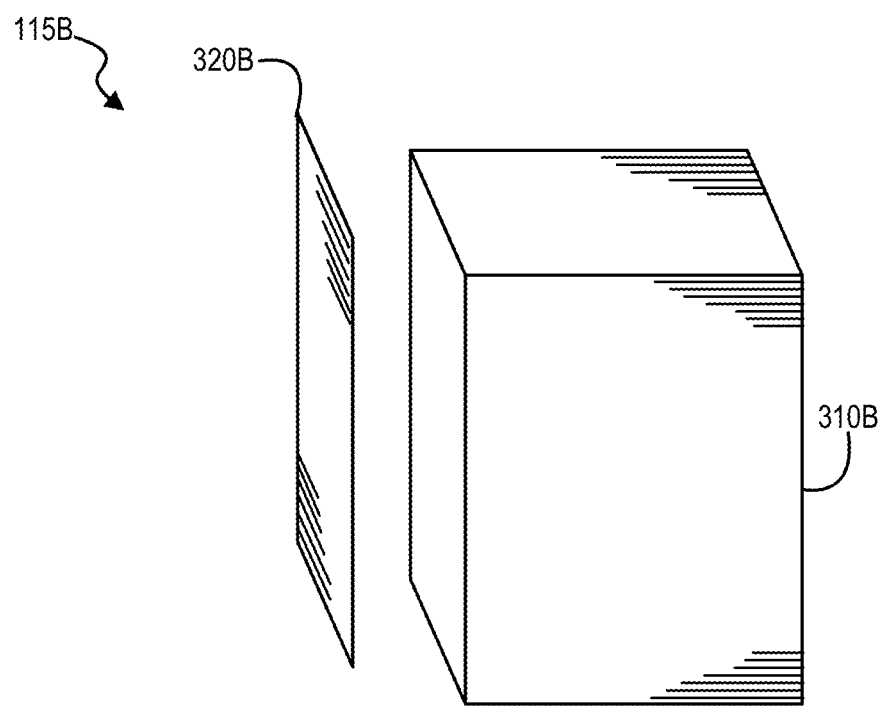

Turning now to FIGS. 3A and 3B, examples of chassis are illustrated, according to one or more embodiments. As shown in FIG. 3A, a chassis 115A may include an enclosure 310A and a lid portion 320A. For example, lid portion 320A may be or include a top lid portion. As illustrated in FIG. 3B, a chassis 115B may include an enclosure 310B and a lid portion 320B. In one example, lid portion 320B may be or include a side lid portion. In another example, lid portion 320B may be or include a back lid portion. In one or more embodiments, a lid portion 320 may be separable from an enclosure 310. In one or more embodiments, a lid portion 320 may be hinged to an enclosure 310. In one or more embodiments, enclosure 310 may be made from a conductor. For example, enclosure 310 may be made from a metal. For instance, enclosure 310 may be grounded with reference to a power supply unit of or associated with IHS 110. In one or more embodiments, lid portion 320 may be made from a conductor. For example, lid portion 320 may be made from a metal. For instance, lid portion 320 may be grounded with reference to a power supply unit of or associated with IHS 110 when lid portion 320 is in contact with enclosure 310. In one or more embodiments, chassis 115A may be different from chassis 115B. In one example, enclosure 310A may be different from enclosure 310B. In another example, lid portion 320A may be different from lid portion 320B.

In one or more embodiments, planar 117 may be mounted in chassis 115A and 115B, where chassis 115A is different from chassis 115B. For example, two different chassis may utilize a same planar. In one or more embodiments, a first IHS 110 may include a first chassis, and a second IHS 110, different from the first IHS 110, may include a second chassis, different from the first chassis. For example, the first IHS 110 may include a first planar, and the second IHS 110 may include a second planar. For instance, the second planar may be a copy of the first planar. In one or more embodiments, the first IHS 110 may perform differently than the second IHS 110. For example, the first IHS 110 may perform differently than the second IHS 110 based at least on the first chassis being different from the second chassis. For instance, the first IHS 110 may perform differently than the second IHS 110 based at least on the first chassis being different from the second chassis even though the second planar may be a copy of the first planar.

In one or more embodiments, the first IHS 110 may be configured differently than the second IHS 110. For example, the first IHS 110 may be configured differently than the second IHS 110 based at least on the first chassis being different from the second chassis. For instance, the first IHS 110 may be configured differently than the second IHS 110 based at least on the first chassis being different from the second chassis even though the second planar may be a copy of the first planar. In one or more embodiments, an IHS 110 may determine a chassis based at least on a chassis ID. In one example, the first IHS 110 may determine the first chassis based at least on the first chassis ID. In a second example, the second IHS 110 may determine the second chassis based at least on the second chassis ID, different from the second chassis ID.

Figure 3C:
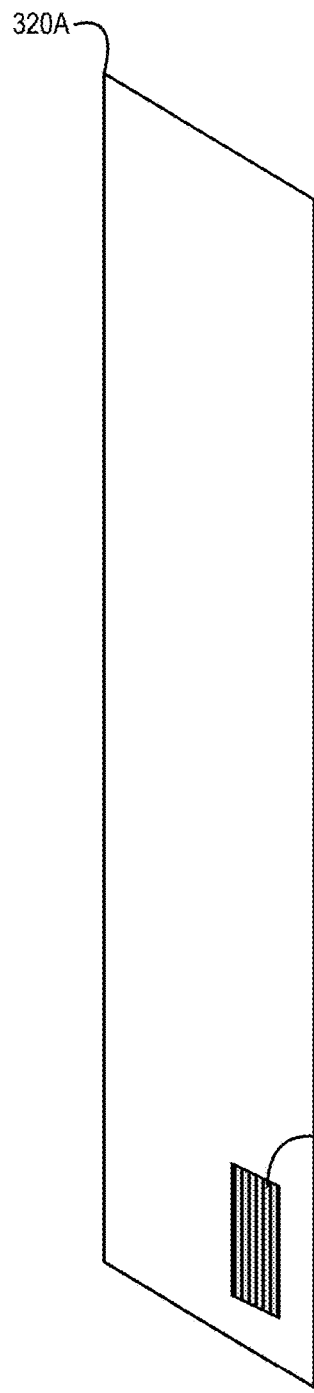
FIGS. 3C-3F illustrate examples of a chassis lid portion and a passive element, according to one or more embodiments.

Turning now to FIGS. 3C-3F, examples of a chassis lid portion and a passive element are illustrated, according to one or more embodiments. As shown in FIG. 3C, a passive element 330A may be coupled to a lid portion 320A. In one or more embodiments, a passive element 330 may be or include a conductor. For example, passive element 330 may be or include a sheet of a conductor. For instance, the conductor may be or include one or more metals.

Figure 3D:
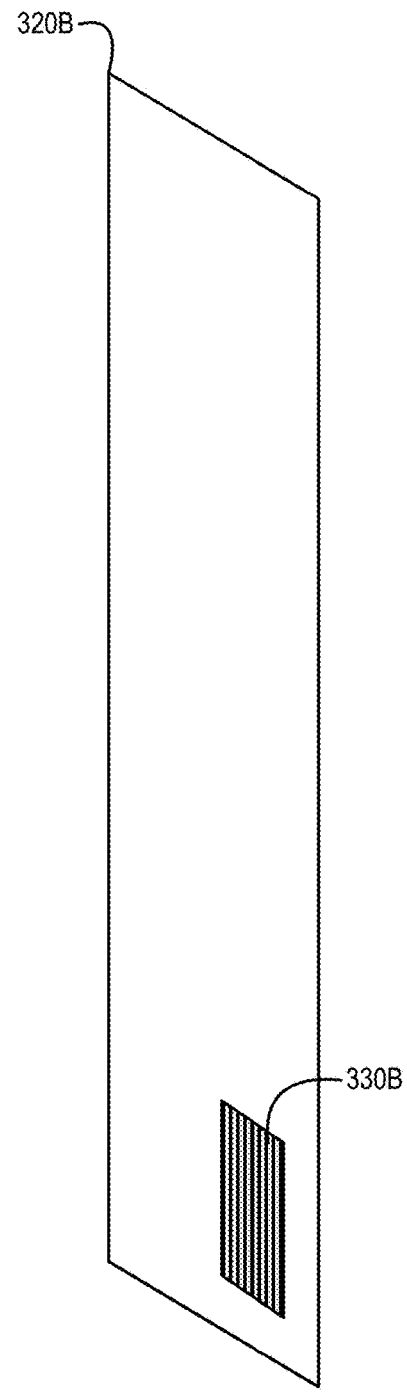

As shown in FIG. 3D, a passive element 330B may be coupled to a lid portion 320B. In one or more embodiments, lid portion 320B may be a copy of lid portion 320A. In one or more embodiments, lid portion 320B may be different from lid portion 320A. In one or more embodiments, passive element 330B may be larger than passive element 330A. For example, a capacitance associated with passive element 330B may be greater than a capacitance associated with passive element 330A. For instance, a capacitance associated with passive element 330 may be associated with an area of passive element 330. As illustrated in FIGS. 3C and 3D, passive elements 330A and 330B may be associated with rectangular shapes.

Figure 3E:
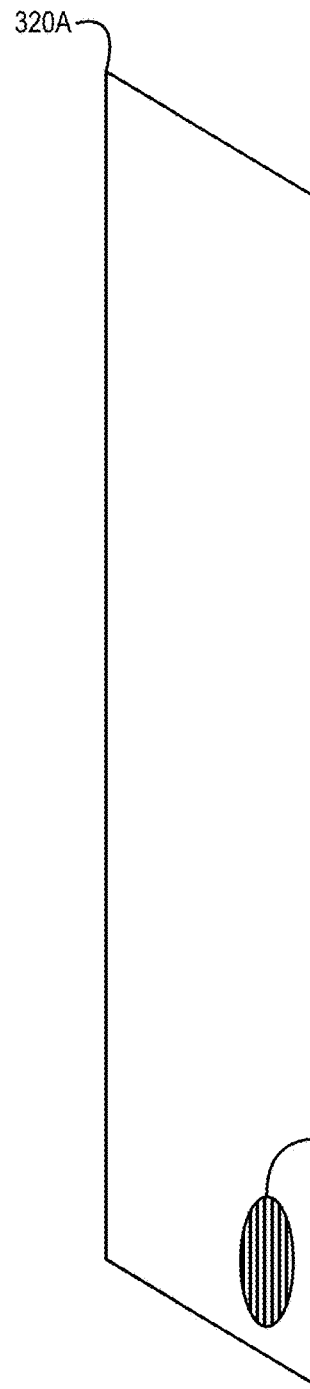
Figure 3F:
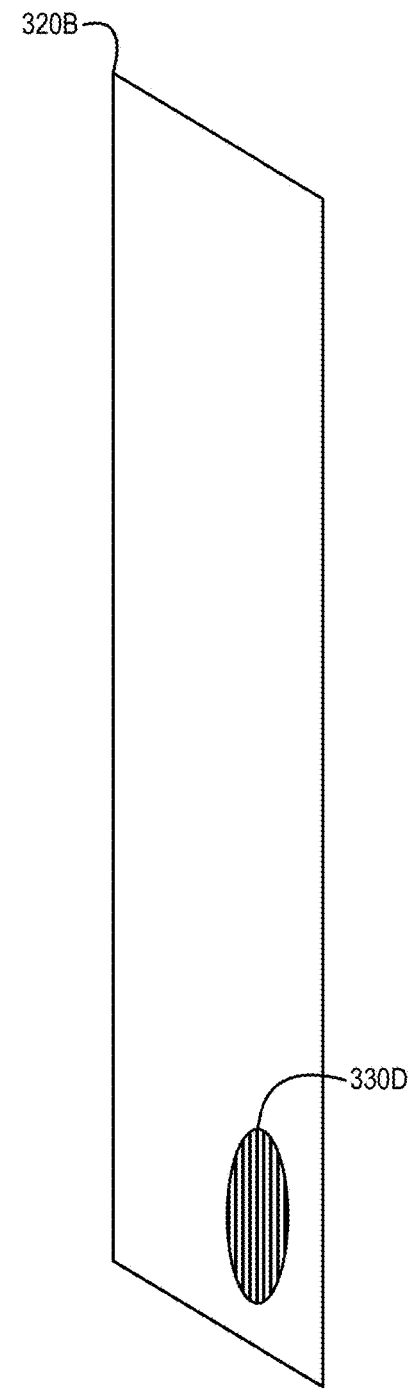

As shown in FIG. 3E, a passive element 330C may be coupled to lid portion 320A. As illustrated in FIG. 3F, a passive element 330D may be coupled to lid portion 320B. In one or more embodiments, passive element 330D may be larger than passive element 330C. For example, a capacitance associated with passive element 330D may be greater than a capacitance associated with passive element 330C. For instance, a capacitance associated with passive element 330 may be associated with an area of passive element 330. As illustrated in FIGS. 3E and 3F, passive elements 330C and 330D may be associated with circular shapes. Although rectangular and circular shapes are illustrated, passive elements 330 may be associated with any shape, according to one or more embodiments.

Figure 3G:
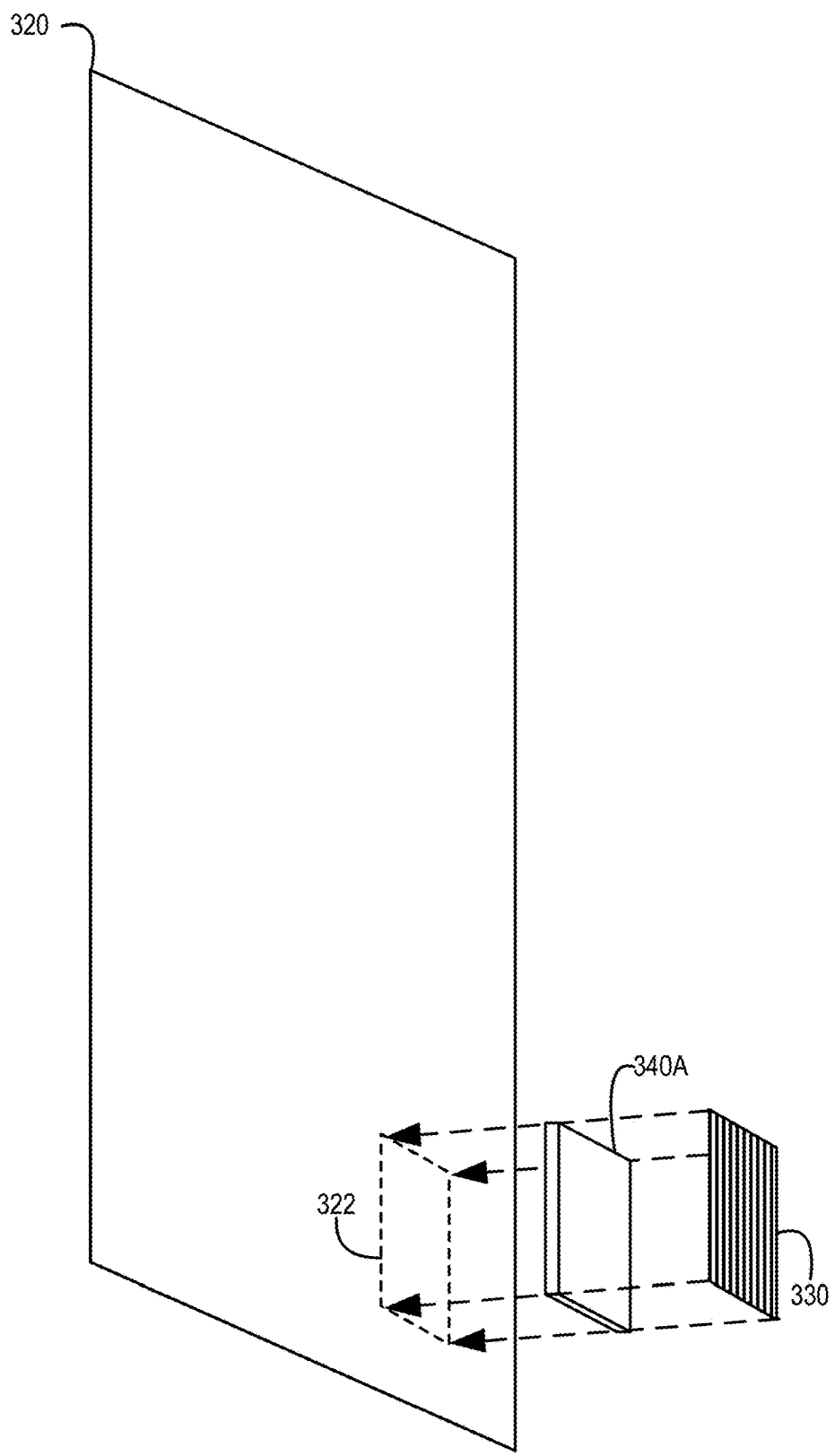
FIGS. 3G and 3H illustrate examples of a chassis lid portion, dielectrics, and a passive element, according to one or more embodiments.
Figure 3H:
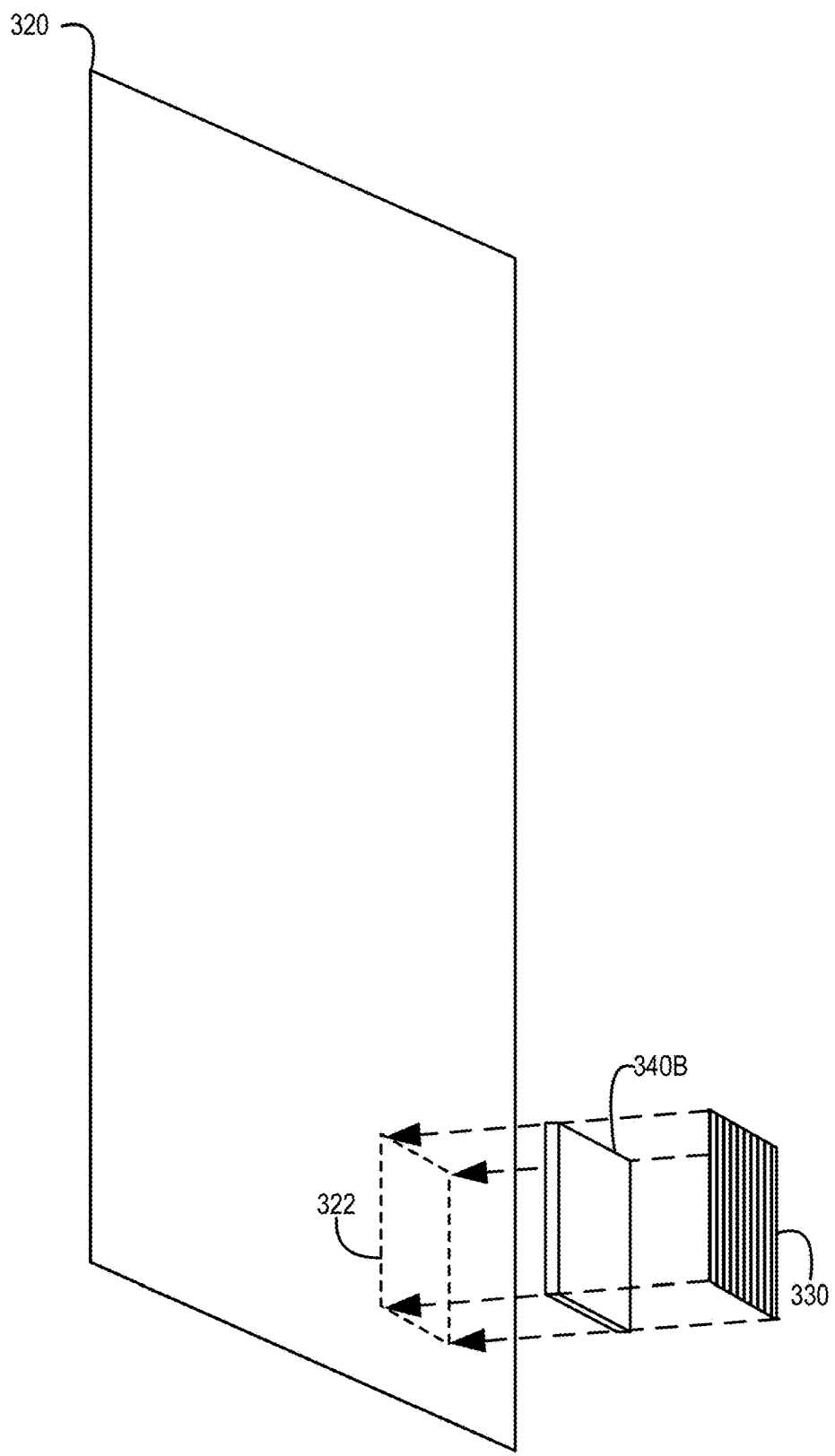

Turning now to FIGS. 3G and 3H, examples of a chassis lid portion, dielectrics, and a passive element are illustrated, according to one or more embodiments. As shown, passive element 330 may be coupled to a dielectric 340A. As illustrated, dielectric 340A may be coupled to a portion 322 of lid portion 320. In one or more embodiments, a lid portion 320, a dielectric 340, and a passive element 330 may form a capacitor. For example, a portion 322 of lid portion 320, a dielectric 340 (e.g., a dielectric material), and a passive element 330 may form a capacitor. In one or more embodiments, dielectric 340 may be or include an electrical insulator. In one or more embodiments, dielectric 340 may include multiple electrical insulators. Some examples of dielectrics include porcelain, glass, most plastics, air, nitrogen, sulfur hexafluoride, electrically insulating fiber materials, parylene, and mineral oil, among others.

In one or more embodiments, passive element 330 may be coupled to dielectric 340 via an adhesive. In one or more embodiments, dielectric 340 may be coupled to lid portion 320 via an adhesive. For example, dielectric 340 may be coupled to portion 322 via an adhesive. In one or more embodiments, passive element 330 and dielectric 340 may be and/or may form "sticker" that may be applied to lid portion 320.

In one or more embodiments, a dielectric 340 may be associated with a permittivity. For example, the permittivity may be a number $\varepsilon \cdot \varepsilon_0$. For instance, $\varepsilon_0$ may be a permittivity of free space (e.g., a vacuum permittivity), and $\varepsilon$ may be a number greater than zero. In one or more embodiments, $\varepsilon_0$ may be or may be approximate to $8.854187817 \times 10^{-12}$ farads per meter. In one or more embodiments, a capacitance associated with passive element 330 may be based at least on a permittivity of dielectric 340. In one or more embodiments, a capacitance associated with passive element 330 may be based at least on a distance between portion 322 and passive element 330. For example, the distance between portion 322 and passive element 330 may be or include a thickness of dielectric 340.

In one or more embodiments, a dielectric 340B may be different from dielectric 340A. For example, a capacitance associated with passive element 330 of FIG. 3G may be different from a capacitance associated with passive element 330 of FIG. 3H, since dielectric 340B may be different from dielectric 340A. For instance, passive element 330 may be the same in FIGS. 3G and 3H, but since dielectric 340B may be different from dielectric 340A, a capacitance associated with passive element 330 of FIG. 3G may be different from a capacitance associated with passive element 330 of FIG. 3H. In one or more embodiments, a capacitance associated with passive element 330 may be based at least on dielectric 340. For example, the capacitance associated with passive element 330 may be based at least on a permittivity of dielectric 340. In one instance, a permittivity of dielectric 340A may be $\varepsilon_A \cdot \varepsilon_0$. In another instance, a permittivity of dielectric 340A may be $\varepsilon_B \cdot \varepsilon_0$. In one or more embodiments, $\varepsilon_A$ and $\varepsilon_B$ may be different numbers.

In one or more embodiments, a capacitance associated with passive element 330 may proportional to a permittivity associated with dielectric 340. In one example, a capacitance associated with passive element 330, illustrated in FIG. 3G, may be proportional to $\varepsilon_A \cdot \varepsilon_0$. In another example, a capacitance associated with passive element 330, illustrated in FIG. 3H, may be proportional to $\varepsilon_B \cdot \varepsilon_0$. In one or more embodiments, if $\varepsilon_A \cdot \varepsilon_0 > \varepsilon_B \cdot \varepsilon_0$, then a capacitance associated with passive element 330 illustrated in FIG. 3G, may be greater than a capacitance associated with passive element 330 illustrated in FIG. 3H.

Figure 3I:
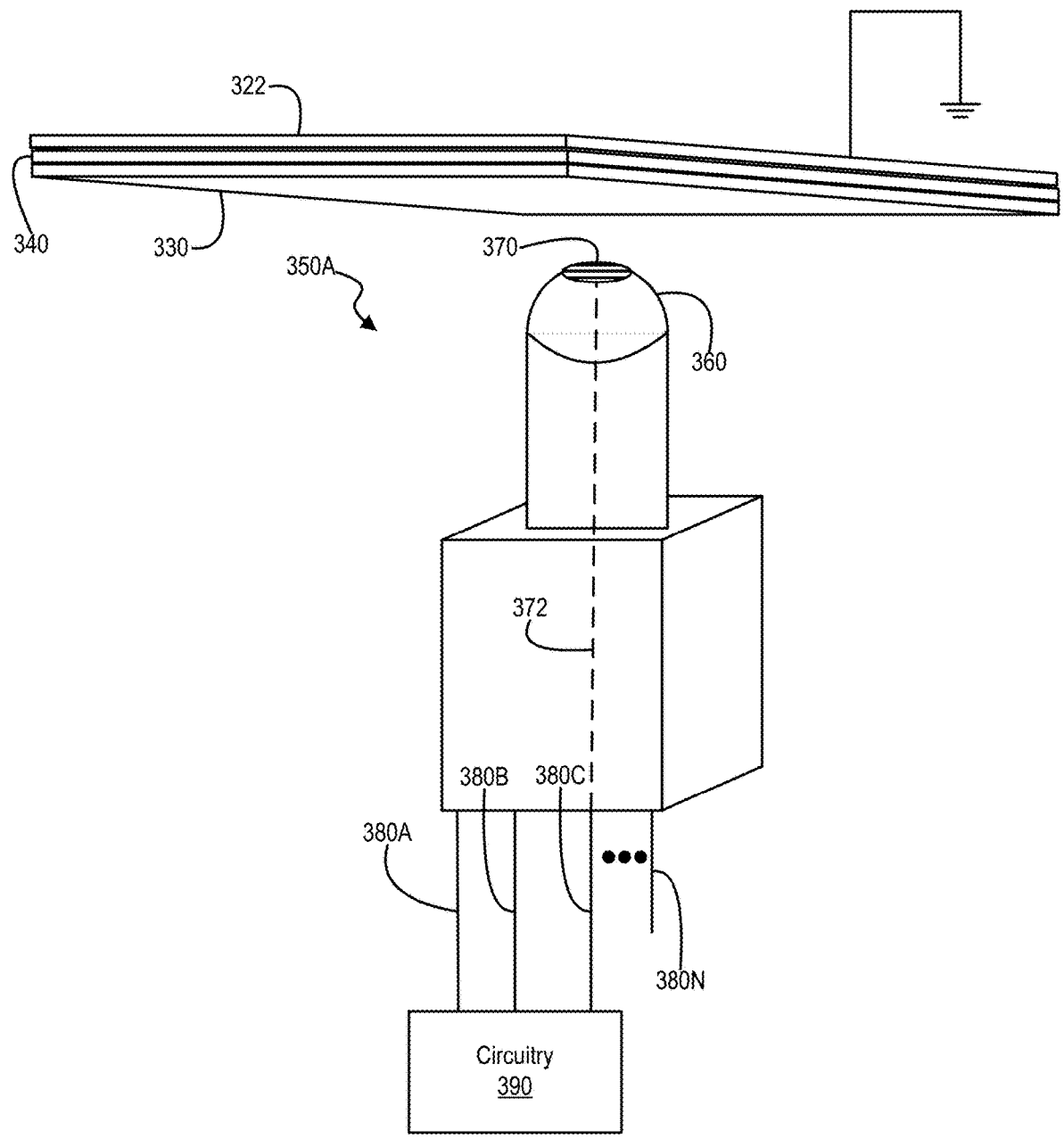
FIGS. 3I and 3J illustrate examples of a passive element and a switch, according to one or more embodiments.
Figure 3J:
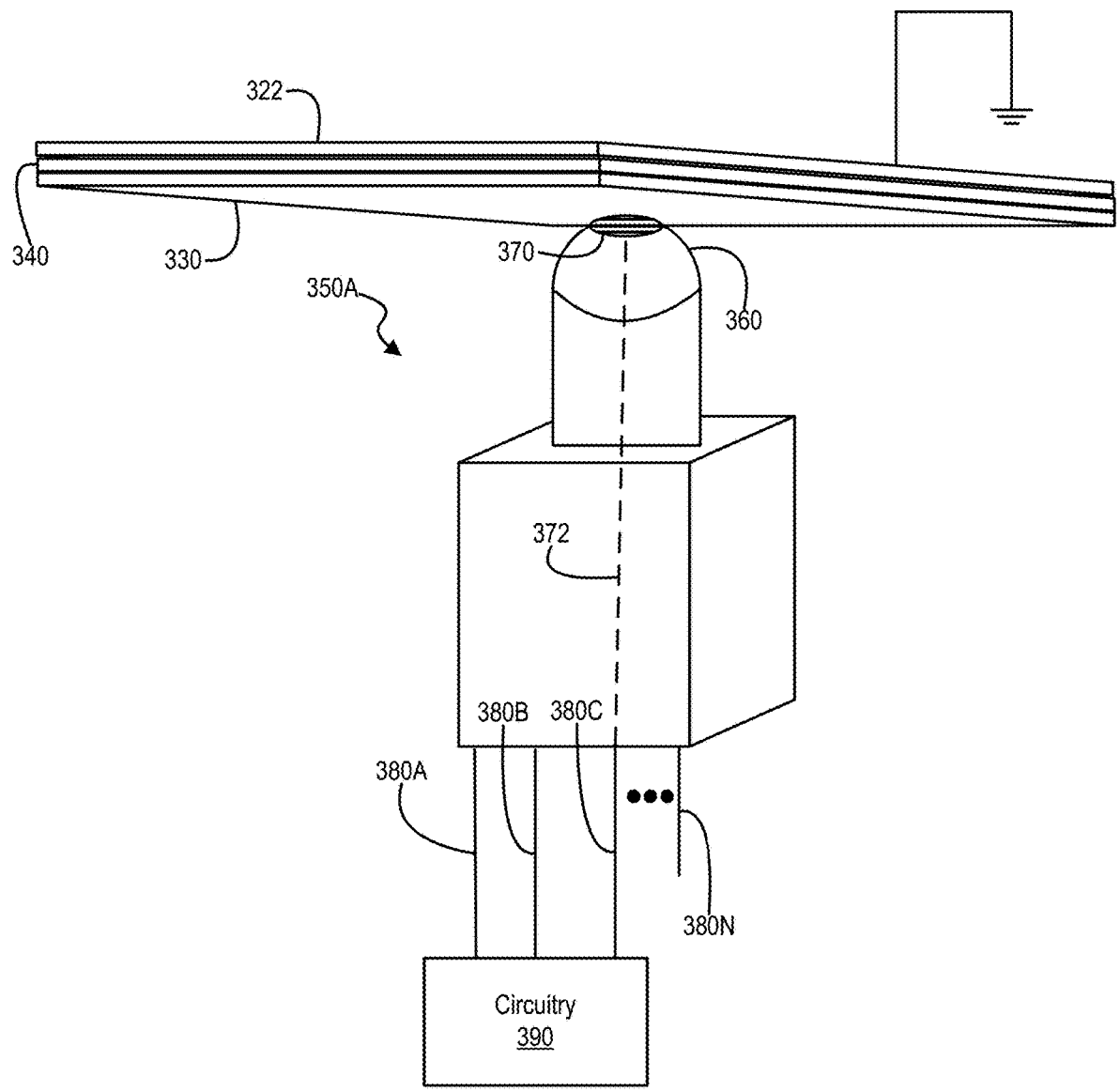

Turning now to FIGS. 3I and 3J, examples of a passive element and a switch are illustrated, according to one or more embodiments. As shown, a switch 350A may include a tip 360. In one or more embodiments, switch 350A may be or include a plunger-type switch. For example, switch 350A may include a spring that may apply force to tip 360. In one or more embodiments, a switch 350 may be or include an intrusion detection switch. As illustrated, tip 360 may include a conductor 370. For example, conductor 370 may be disposed on switch 350A. For instance, conductor 370 may be disposed on tip 360. In one or more embodiments, intrusion device 140 may be or include a switch 350. In one or more embodiments, a switch 350 may include multiple conductors. As shown, switch 350A may include conductors 380A-380N. In one or more embodiments, a conductor 380 may be coupled to one or more components of IHS 110.

As illustrated in FIG. 3I, conductor 370 may not be coupled to passive element 330. For example, switch 350A may not be actuated. In one or more embodiments, conductors 380A and 380B may be utilized in determining if switch 350A is actuated. In one or more embodiments, conductor 380C may be coupled to conductor 370. For example, conductor 380C may be coupled to conductor 370 via conductor 372. As shown, conductors 380A-380C may be coupled to circuitry 390. In one or more embodiments, a component of IHS 110 may include circuitry 390. In one example, CPLD 130 may include circuitry 390. In a second example, FPGA 135 may include circuitry 390. In a third example, intrusion device 140 may include circuitry 390. In another example, BMC 185 may include circuitry 390. In one or more embodiments, a component of IHS 110 may be coupled to circuitry 390. In one example, CPLD 130 may be coupled to circuitry 390. In a second example, FPGA 135 may be coupled to circuitry 390. In a third example, intrusion device 140 may be coupled to circuitry 390. In another example, BMC 185 may be coupled to circuitry 390. In one or more embodiments, a component of IHS 110 may control circuitry 390. In one example, CPLD 130 may control circuitry 390. In a second example, FPGA 135 may control circuitry 390. In a third example, intrusion device 140 may control circuitry 390. In another example, BMC 185 may control circuitry 390.

As illustrated in FIG. 3J, conductor 370 may be coupled to passive element 330. For example, switch 350A may be actuated. In one instance, lid portion 320 may be in physical contact with other one or more portions of chassis 115. In another instance, conductor 370 may in physical contact with passive element 330. In one or more embodiments, chassis 115 may be closed. In one or more embodiments, passive element 330 may be charged and/or discharged via one or more of conductors 380C and 370. For example, conductor 380C may be coupled to conductor 370 via a conductor 372. For instance, conductor 372 may be internal to switch 150A. In one or more embodiments, portion 322 of lid portion 320 may be coupled to ground. For example, lid portion 320 may be coupled to ground. For instance, lid portion 320 may be coupled to ground when lid portion 320 is coupled to enclosure 310.

In one or more embodiments, circuitry 390 may determine if switch 350A is actuated. For example, circuitry 390 may determine if switch 350A is actuated via conductors 380A and 380B. In one or more embodiments, circuitry 390 may charge passive element 330 via conductor 380C. In one or more embodiments, circuitry 390 may permit passive element 330 to discharge via conductor 380C. In one or more embodiments, circuitry 390 may determine one or more voltage values associated with passive element 330 as passive element 330 discharges. For example, circuitry 390 may determine, via conductor 380C, one or more voltage values associated with passive element 330 as passive element 330 discharges.

Figure 3K:
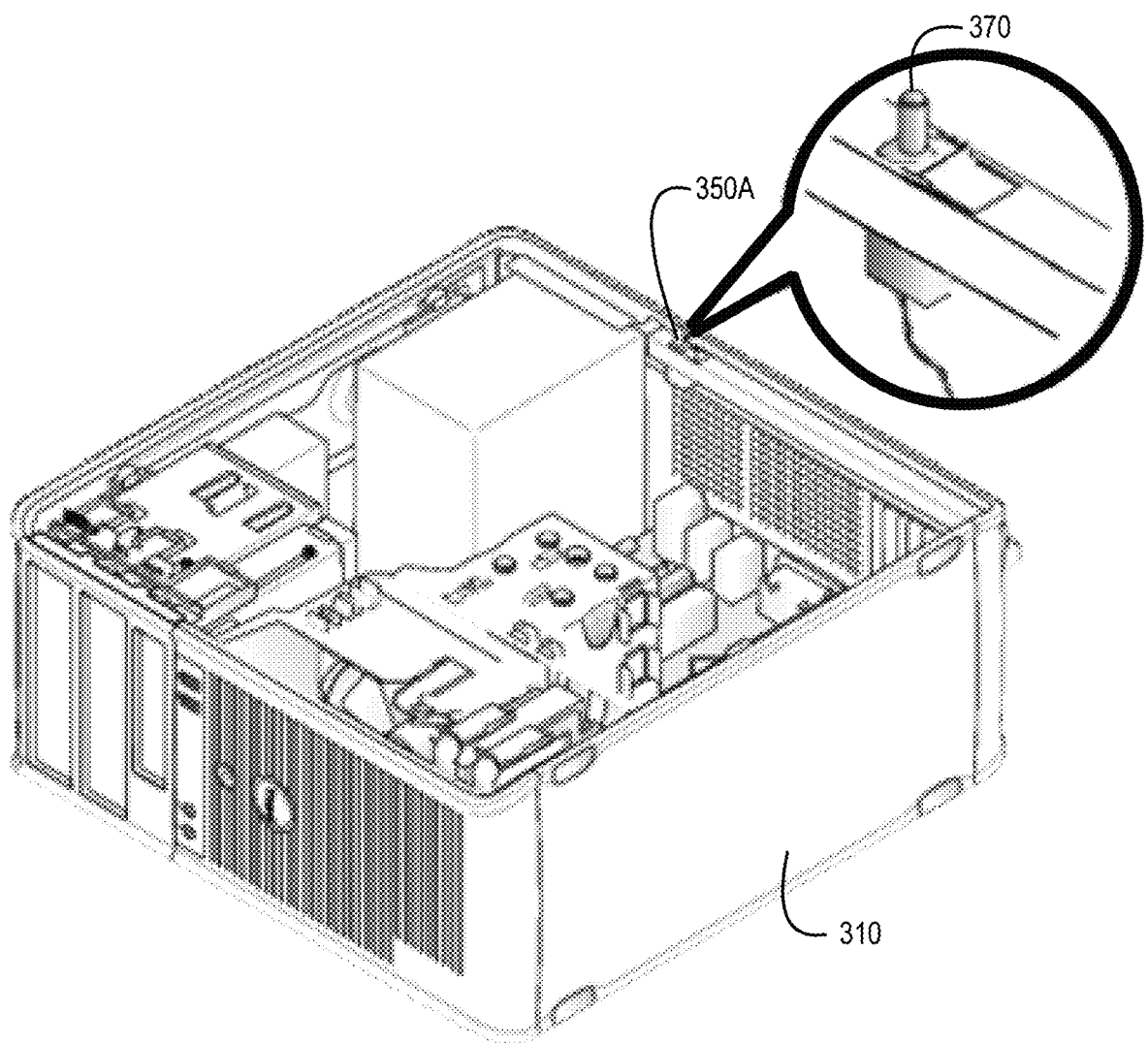
FIG. 3K illustrates an example of an enclosure and a switch, according to one or more embodiments.

Turning now to FIG. 3K, an example of an enclosure and a switch is illustrated, according to one or more embodiments. In one or more embodiments, switch 350A may be mounted to and/or in chassis 115. As illustrated, switch 350A may be mounted to and/or in enclosure 310.

Figure 3L:
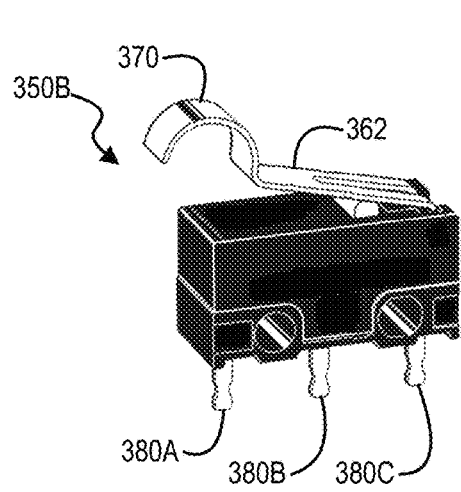
FIGS. 3L and 3M illustrate examples of switches, according to one or more embodiments.
Figure 3M:
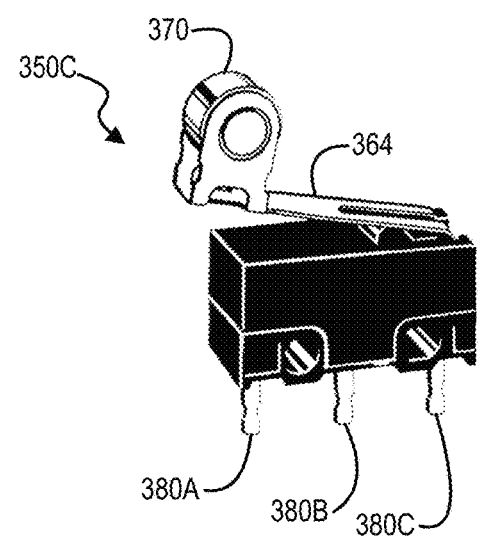

Turning now to FIGS. 3L and 3M, examples of switches are illustrated, according to one or more embodiments. In one or more embodiments, switches 350B and 350C may be lever-type switches. As shown in FIG. 3L, switch 350B may include a lever 362. As illustrated, lever 362 may include a conductor 370. In one or more embodiments, conductors 380A and 380B may be utilized in determining if switch 350B is actuated. In one or more embodiments, conductor 380C may be coupled to conductor 370.

As shown in FIG. 3M, switch 350C may include a lever 364. As illustrated, lever 364 may include a conductor 370. In one or more embodiments, lever 364 may include a roller. In one or more embodiments, conductors 380A and 380B may be utilized in determining if switch 350C is actuated. In one or more embodiments, conductor 380C may be coupled to conductor 370. In one or more embodiments, a lever of a switch may be combined with a conductor. In one example, lever 362 may be combined with conductor 370. For instance, lever 362 may be or include a conductor. In another example, lever 364 may be combined with conductor 370. For instance, lever 364 may be or include a conductor. In one or more embodiments, the roller of lever 364 may be or include a conductor.

Figure 3N:
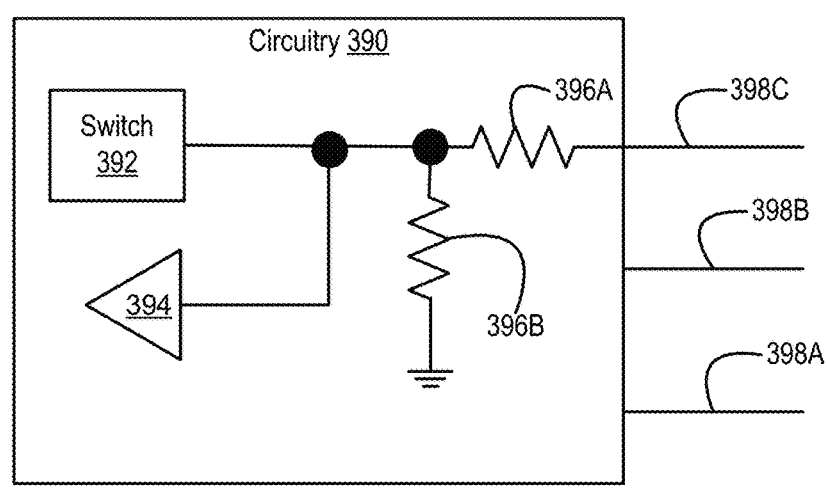
FIG. 3N illustrates an example of circuitry, according to one or more embodiments.

Turning now to FIG. 3N, an example of circuitry is illustrated, according to one or more embodiments. As shown, circuitry 390 may include a switch 392. In one or more embodiments, switch 392 may be electronically actuated. In one or more embodiments, switch 392 may provide charge. For example, switch 392 may provide charge at a voltage. For instance, switch 392 may provide charge at a voltage value (e.g., $V_0$).

In one or more embodiments, switch 392 be or include a transistor. For example, a transistor may include a bipolar junction transistor (BJT), a junction gate field-effect transistor (JFET), or a metal-oxide-semiconductor field-effect transistor (MOSFET), among others. In one or more embodiments, switch 392 may be or include a logic gate. In one or more embodiments, switch 392 may be or include a mechanical switch. In one example, the mechanical switch may be normally open. In another example, the mechanical switch may be normally closed.

As illustrated, circuitry 390 may include an analog to digital converter (ADC) 394. In one or more embodiments, an ADC may convert one or more analog voltages into respective one or more digital voltage values. In one or more embodiments, a digital to analog converter (DAC) may be utilized in place of switch 392. For example, a DAC may convert one or more digital voltage values into one or more analog voltages.

As shown, circuitry 390 may include resistors 396A and 396B. In one or more embodiments, resistor 396A may be a current limiting resistor. In one or more embodiments, leads 398A-398C may be coupled to conductors 380A-380C, respectively. As illustrated, lead 398C may be coupled to resistors 396A. In one or more embodiments, leads 398A and 398B may be coupled to other components of circuitry 390 that are not specifically illustrated. In one example, the other components of circuitry 390 that are not specifically illustrated may determine if a switch 350 is actuated. In another example, the other components of circuitry 390 that are not specifically illustrated may be utilized in determining if a switch 350 is actuated.

Figure 4:
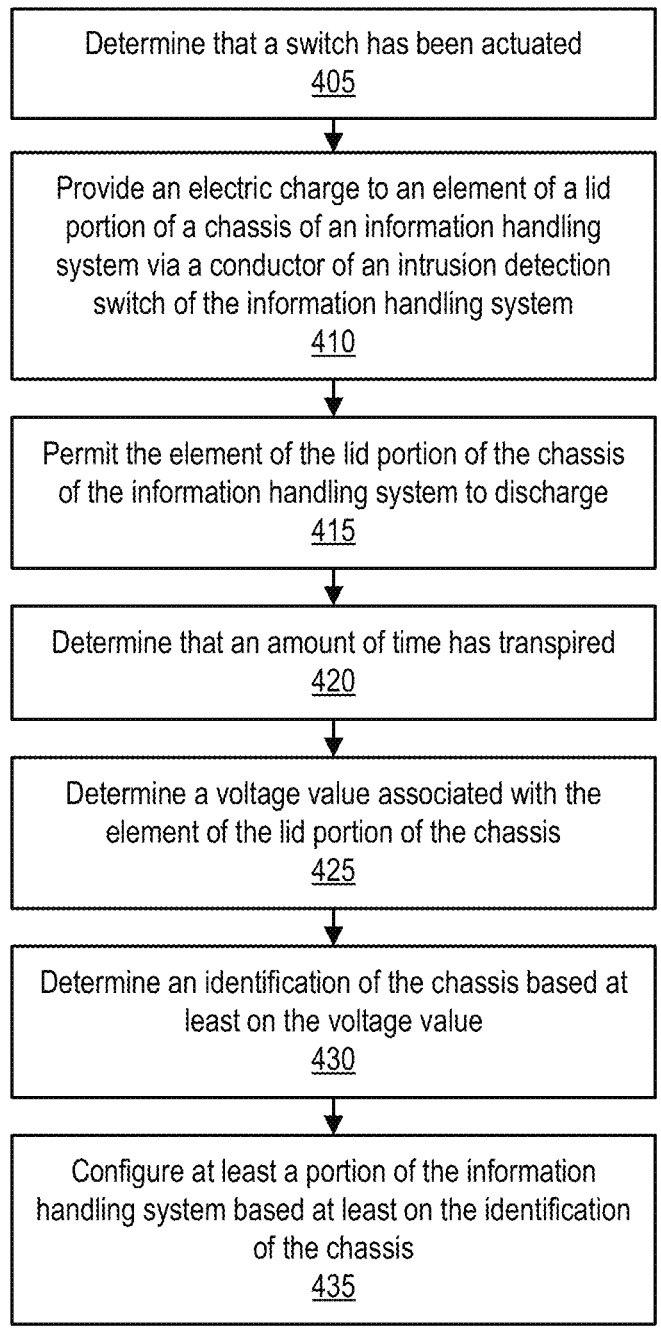
FIG. 4 illustrates an example of a method, according to one or more embodiments.

Turning now to FIG. 4, an example of a method is illustrated, according to one or more embodiments. At 405, it may be determined that a switch has been actuated. For example, it may be determined that switch 350 has been actuated. In one or more embodiments, determining that a switch has been actuated may include determining that an intrusion detection switch has been actuated. At 410, an electric charge may be provided to an element of a lid portion of a chassis of an information handling system via a conductor of an intrusion detection switch of the information handling system. For example, circuitry 390 may provide an electric charge to passive element 330 of lid portion 320 of IHS 110. For instance, circuitry 390 may provide an electric charge to passive element 330 via conductor 370. In one or more embodiments, providing the electric charge to the element of the lid portion of a chassis may be performed in response to determining that the intrusion detection switch of the information handling system has been actuated. In one or more embodiments, a charge of passive element 330 may be associated with a voltage value. For example, the voltage value may be $V_0$, illustrated in FIGS. 5A and 5B.

Figure 5A:
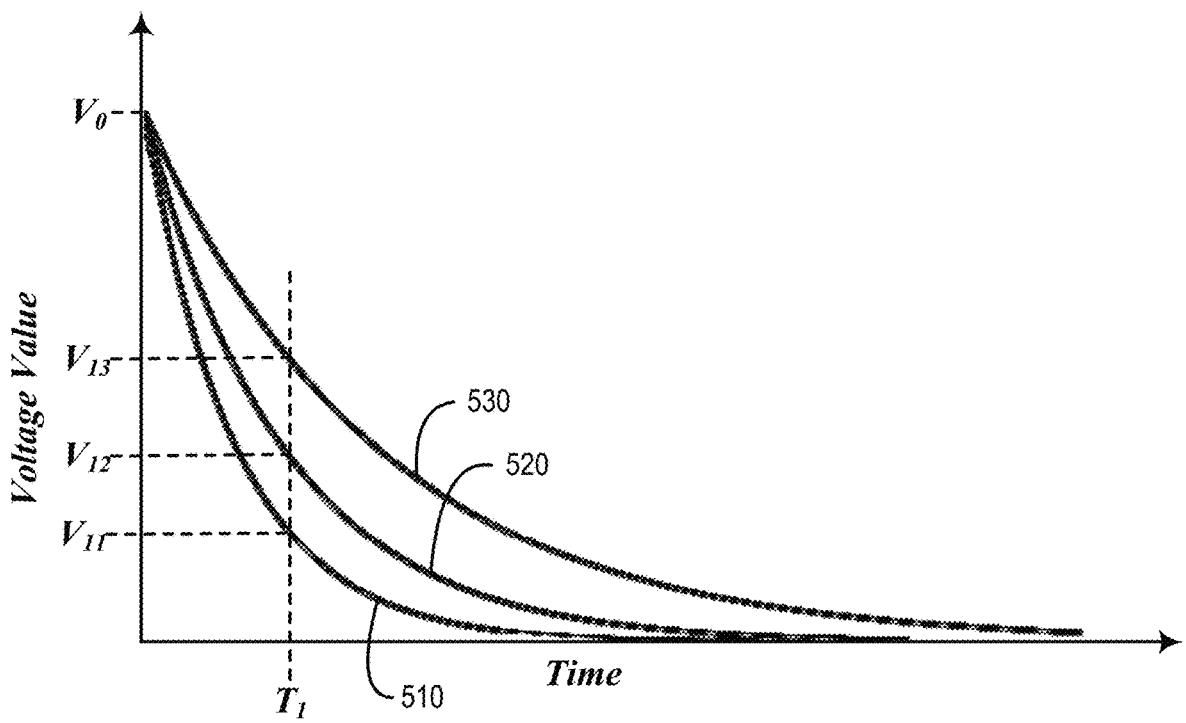
FIGS. 5A and 5B illustrate examples of discharge curves, according to one or more embodiments.
Figure 5B:
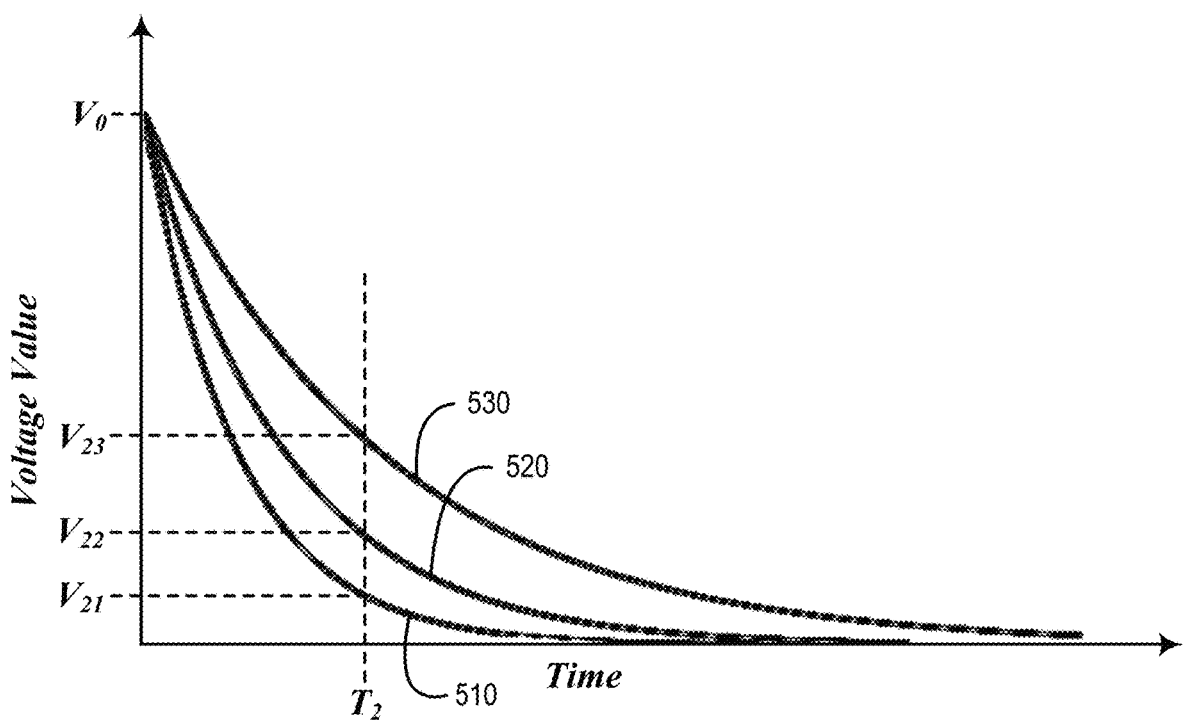

At 415, the element of the lid portion of the chassis of the information handling system may be permitted to discharge. Example discharge curves 510-530 are illustrated in FIGS. 5A and 5B, according to one or more embodiments. As shown in FIGS. 5A and 5B, discharge curves 510-530 are plotted as voltage value versus time. In one or more embodiments, permitting the element of the lid portion of the chassis of the information handling system to discharge may include discharging the element of the lid portion for an amount of time. In one example, the amount of time may be $T_1$, illustrated in FIG. 5A. In another example, the amount of time may be $T_2$, illustrated in FIG. 5B.

In one or more embodiments, discharge curves 510-530 may represent discharge decays of respective different passive elements 330. For example, the different passive elements 330 may be respectively associated with different respective capacitance values. In one instance, discharge curve 510 may be proportional to $V_0 \cdot K \cdot e^{-t/\tau_1}$. In a second instance, discharge curve 520 may be proportional to $V_0 \cdot K \cdot e^{-t/\tau_2}$. In another instance, discharge curve 530 may be proportional to $V_0 \cdot K \cdot e^{-t/\tau_3}$. In one or more embodiments, K may be a constant. In one example, K may be one. In another example, K may be $$\frac{R_{396B}}{R_{396A} + R_{396B}},$$

where $R_{396A}$ is the resistance value of resistor 396A and $R_{396B}$ is the resistance value of resistor 396B. In one or more embodiments, τ may be equal to RC, where R is a sum of the resistance values of resistors 396A and 396B and C is a capacitance value associated with passive element 330. In one example, $\tau_1$ may be equal to $RC_1$, where $C_1$ is a capacitance value associated with a first passive element 330. In a second example, $\tau_2$ may be equal to $RC_2$, where $C_2$ is a capacitance value associated with a second passive element 330, different from the first passive element 330. In another example, $\tau_3$ may be equal to $RC_3$, where $C_3$ is a capacitance value associated with a third passive element 330, different from the first passive element 330 and different from the second first passive element 330.

At 420, it may be determined that an amount of time has transpired. In one example, it may be determined that an amount of time $T_1$, illustrated in FIG. 5A, has transpired. In another example, it may be determined that an amount of time $T_2$, illustrated in FIG. 5B, has transpired. In one or more embodiments, determining that the amount of time has transpired may be performed after the electric charge has been provided to the element of the lid portion of the chassis of the information handling system. For example, determining that the amount of time has transpired may be performed after switch 392 has been turned off. For instance, determining that the amount of time has transpired may be performed after switch 392 no longer provides electric charge. In one or more embodiments, determining that an amount of time has transpired may include utilizing a timer. For example, the timer may expire after the amount of time has transpired. For instance, the timer may signal an interrupt after the amount of time has transpired.

At 425, a voltage value associated with the element of the lid portion of the chassis may be determined. For example, circuitry 390 may determine the voltage value associated with the element of the lid portion of the chassis (e.g., passive element 330). For instance, ADC 394 may determine the voltage value (e.g., a digital voltage value) associated with the element of the lid portion of the chassis (e.g., passive element 330).

In one or more embodiments, a capacitance value associated with the element of the lid portion of a chassis may be determined based at least on the voltage value associated with the element of the lid portion of the chassis. For example, a capacitance value associated with passive element 330 may be determined based at least on the voltage value associated with passive element 330. In one or more embodiments, the voltage value associated with the element of the lid portion of the chassis may be provided to one or more of CPLD 130, FPGA 135, OS 162, IHSFW 172, and BMC 185, among others. In one or more embodiments, one or more of CPLD 130, FPGA 135, OS 162, IHSFW 172, and BMC 185, among others, may receive the voltage value associated with the element of the lid portion of the chassis.

At 430, an identification of the chassis may be determined based at least on the voltage value. In one or more embodiments, a data structure may include multiple voltage values and respectively associated chassis identifications (IDs). For example, the data structure may include a lookup table that may include the multiple voltage values and the respectively associated chassis IDs. In one or more embodiments, the identification of the chassis may be determined based at least on the capacitance value. For example, determining the identification of the chassis based at least on the voltage value may be further based at least on the capacitance value. In one or more embodiments, the chassis ID may be provided to one or more of CPLD 130, FPGA 135, OS 162, IHSFW 172, and BMC 185, among others. In one or more embodiments, to one or more of CPLD 130, FPGA 135, OS 162, IHSFW 172, and BMC 185, among others, may receive the chassis ID. In one or more embodiments, the chassis ID may be utilized in determining a branding of IHS 110, one or more thermal tables, one or more bay numberings, and/or one or more slot numberings, among others. In one or more embodiments, the chassis ID may be provided OS 162 via a management information exchange. For example, one or more of CPLD 130, FPGA 135, IHSFW 172, and BMC 185, among others, may provide the chassis ID may be provided OS 162 via a management information exchange. In one or more embodiments, a management information exchange may include one or more of WMI and CIM, among others. For example, the chassis ID may be provided OS 162 via one or more of WMI and CIM, among others.

In one or more embodiments, the data structure may be stored via one or more of memory media 150, 160, 170, 250, and 270, among others. In one or more embodiments, one or more of CPLD 130, FPGA 135, and an ASIC, among others, may be configured with the data structure. For example, the one or more of CPLD 130, FPGA 135, and the ASIC may store the data structure. For instance, the one or more of CPLD 130, FPGA 135, and the ASIC may be configured with the lookup table that may include the multiple voltage values and the respectively associated chassis IDs. In one or more embodiments, configuring one or more of CPLD 130 and FPGA 135 to store the data structure may include programming the one or more of CPLD 130 and FPGA 135 to store the data structure. For example, the one or more of CPLD 130 and FPGA 135 may be programmed with the lookup table that may include the multiple voltage values and the respectively associated chassis IDs.

In one or more embodiments, the data structure may include an amount of time $T_1$. In one or more embodiments, the data structure may include voltage values $V_{11}$, $V_{12}$, and $V_{13}$, among others. For example, it may be determined if the voltage value associated with the element of the lid portion of the chassis matches a voltage value of voltage values $V_{11}$, $V_{12}$, and $V_{13}$. For instance, voltage values $V_{11}$, $V_{12}$, and $V_{13}$ may be associated with a first chassis ID, a second chassis ID, and a third chassis ID, respectively.

If the voltage value associated with the element of the lid portion of the chassis matches a voltage value of voltage values $V_{11}$, $V_{12}$, and $V_{13}$, the chassis ID of the information handling system may be determined. In one example, if the voltage value associated with the element of the lid portion of the chassis matches voltage value $V_{11}$, the chassis ID of the information handling system may be determined as the first chassis ID. In a second example, if the voltage value associated with the element of the lid portion of the chassis matches voltage value $V_{12}$, the chassis ID of the information handling system may be determined as the second chassis ID. In another example, if the voltage value associated with the element of the lid portion of the chassis matches voltage value $V_{13}$, the chassis ID of the information handling system may be determined as the third chassis ID.

In one or more embodiments, the data structure may include an amount of time $T_2$. In one or more embodiments, the data structure may include voltage values $V_{21}$, $V_{22}$, and $V_{23}$, among others. For example, it may be determined if the voltage value associated with the element of the lid portion of the chassis matches a voltage value of voltage values $V_{21}$, $V_{22}$, and $V_{23}$. For instance, voltage values $V_{21}$, $V_{22}$, and $V_{23}$ may be associated with the first chassis ID, the second chassis ID, and the third chassis ID, respectively.

If the voltage value associated with the element of the lid portion of the chassis matches a voltage value of voltage values $V_{21}$, $V_{22}$, and $V_{23}$, the chassis ID of the information handling system may be determined. In one example, if the voltage value associated with the element of the lid portion of the chassis matches voltage value $V_{21}$, the chassis ID of the information handling system may be determined as the first chassis ID. In a second example, if the voltage value associated with the element of the lid portion of the chassis matches voltage value $V_{22}$, the chassis ID of the information handling system may be determined as the second chassis ID. In another example, if the voltage value associated with the element of the lid portion of the chassis matches voltage value $V_{23}$, the chassis ID of the information handling system may be determined as the third chassis ID. In one or more embodiments, if the voltage value associated with the element of the lid portion of the chassis does not match a voltage value stored via the data structure, a default chassis ID may be utilized. In one or more embodiments, if the voltage value associated with the element of the lid portion of the chassis does not match a voltage value stored via the data structure, an error may be indicated.

In one or more embodiments, determining if the voltage value associated with the element of the lid portion of the chassis matches a voltage value stored via the data structure may include determining if the voltage value associated with the element of the lid portion of the chassis is within a range of a voltage value stored via the data structure. For example, determining if the voltage value associated with the element of the lid portion of the chassis matches a voltage value stored via the data structure may include determining if the voltage value associated with the element of the lid portion of the chassis is within plus or minus an amount of a voltage value stored via the data structure. In one or more embodiments, the data structure may store data associated with the range.

In one or more embodiments, determining the identification of the chassis based at least on the voltage value may include determining the identification of the chassis based at least on multiple voltage values. For example, a first voltage value associated with the element of the lid portion of the chassis may be determined at time $T_1$, and a second voltage value associated with the element of the lid portion of the chassis may be determined at time $T_2$. In one instance, if the first voltage value associated with the element of the lid portion of the chassis and the second voltage value associated with the element of the lid portion of the chassis matches voltage values $V_{11}$ and $V_{21}$, respectively, the chassis ID of the information handling system may be determined as the first chassis ID. In a second instance, if the first voltage value associated with the element of the lid portion of the chassis and the second voltage value associated with the element of the lid portion of the chassis matches voltage values $V_{12}$ and $V_{22}$, respectively, the chassis ID of the information handling system may be determined as the second chassis ID. In another instance, if the first voltage value associated with the element of the lid portion of the chassis and the second voltage value associated with the element of the lid portion of the chassis matches voltage values $V_{13}$ and $V_{23}$, respectively, the chassis ID of the information handling system may be determined as the third chassis ID.

At 435, at least a portion of the information handling system may be configured based at least on the identification of the chassis. In one example, power distribution within IHS 110 may be configured based at least on the identification of the chassis. In another example, a thermal profile of IHS 110 may be configured based at least on the identification of the chassis.

In one or more embodiments, an inventory of one or more components of the information handling system may be determined based at least on the identification of the chassis. For example, the data structure may further include multiple inventories associated with multiple chassis IDs. In one or more embodiments, configuring the information handling system may include configuring the information handling system to utilize the one or more components of the information handling system. In one or more embodiments, the one or more components of the information handling system may be configured. For example, configuring the one or more component of the information handling system may be performed in response to determining the inventory of the one or more components of the information handling system based at least on the identification of the chassis.

In one or more embodiments, one or more systems, one or more methods, one or more processes, and/or one or more flowcharts described above may be utilized with one or more backplanes. For example, a passive element 330 may be coupled to a backplane wall. In one or more embodiments, passive element 330 may be utilized in determining a location of a backplane within an IHS 110. In one or more embodiments, a backplane may be coupled to a planar via a cable. For example, a backplane may not be mounted to or on a planar. In one or more embodiments, configuration of an IHS 110 may be based at least on a location of a backplane. In one example, a configuration of removing excess heat (e.g., thermal energy) from IHS 110 may be based at least on the location of the backplane. In another example, a configuration of providing and/or distributing power within IHS 110 may be based at least on the location of the backplane.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a chassis that includes a lid portion;
a mechanical switch that includes a conductor configured to provide an electric charge to an element of the lid portion of the chassis;
a motherboard;
at least one of a baseboard management controller (BMC), a field programmable gate array (FPGA), an application specific integrated circuit (ASIC), and a complex logic device (CPLD) disposed on the motherboard and coupled to the switch;

at least one processor disposed on the motherboard; and a memory medium, coupled to the at least one processor, that stores instructions executable by the at least one processor;

wherein the at least one of the BMC, the FPGA, the ASIC, and the CPLD is configured to:
  determine that the mechanical switch has been actuated;
  provide, via the conductor of the mechanical switch, the electric charge to the element of the lid portion of the chassis;
  after providing the electric charge to the element of the lid portion of the chassis, permit the element of the lid portion of the chassis to discharge;
  determine that an amount of time has transpired after ceasing to provide the electric charge to the element of the lid portion of the chassis;
  in response to determining that the amount of time has transpired, determine a voltage value of the discharge of the element of the lid portion of the chassis;
  identify a data structure storing, for one or more voltage values, an associated chassis identification;
  determine, based on the data structure, a chassis identification that corresponds to the determined voltage value; and
  configure at least a portion of the information handling system in response to the identification of the chassis.

2. The information handling system of claim 1, wherein the at least one of the BMC, the FPGA, the ASIC, and the CPLD is further configured to determine, based at least on the voltage, a capacitance value associated with the element of the lid portion of the chassis; and
wherein determining the identification of the chassis from the plurality of chassis identifications based at least on the voltage value is further based at least on the capacitance value.

3. The information handling system of claim 1, wherein the mechanical switch is an intrusion detection switch.

4. The information handling system of claim 1, wherein the at least one of the BMC, the FPGA, the ASIC, and the CPLD is further configured to determine an inventory of one or more components of the information handling system based at least on the identification of the chassis; and
wherein, to configure the at least the portion of the information handling system, the at least one of the BMC, the FPGA, the ASIC, and the CPLD is further configured to configure the information handling system to utilize the one or more components of the information handling system.

5. The information handling system of claim 4, wherein the at least one of the BMC, the FPGA, the ASIC, and the CPLD is further configured to configure the one or more components of the information handling system.

6. The information handling system of claim 1, wherein the at least one of the BMC, the FPGA, the ASIC, and the CPLD is further configured to discharge the element of the lid portion to discharge for the amount of time.

7. The information handling system of claim 1, wherein the element of the lid portion of the chassis is separated from the lid portion of the chassis by a dielectric.

8. The baseboard management controller of claim 1, wherein the instructions further cause the baseboard management controller to discharge the element of the lid portion to discharge for the amount of time.

9. A method, comprising:
  determining that a mechanical switch of an information handling system has been actuated;
  providing, via a conductor of the mechanical switch, an electric charge to an element of a lid portion of a chassis of the information handling system;
  after the providing the electric charge to the element of the lid portion of the chassis, permitting the element of the lid portion of the chassis to discharge;
  determining that an amount of time has transpired after ceasing to provide the electric charge to the element of the lid portion of the chassis;
  in response to the determining that the amount of time has transpired, determining a voltage value of the discharge of the element of the lid portion of the chassis;
  identify a data structure storing, for one or more voltage values, an associated chassis identification;
  determining, based on the data structure, a chassis identification that corresponds to the determined voltage value; and
  configuring the information handling system in response to the identification of the chassis.

10. The method of claim 9, further comprising:
determining, based at least on the voltage, a capacitance value associated with the element of the lid portion of the chassis;
wherein the determining the identification of the chassis from the plurality of chassis identifications based at least on the voltage value is further based at least on the capacitance value.

11. The method of claim 9, wherein the mechanical switch is an intrusion detection switch.

12. The method of claim 9, further comprising:
determining an inventory of one or more components of the information handling system based at least on the identification of the chassis;
wherein the configuring the information handling system includes configuring the information handling system to utilize the one or more components of the information handling system.

13. The method of claim 12, further comprising:
configuring the one or more components of the information handling system.

14. The method of claim 9, further comprising:
discharging the element of the lid portion to discharge for the amount of time.

15. The method of claim 9, wherein the element of the lid portion of the chassis is separated from the lid portion of the chassis by a dielectric.

16. A baseboard management controller, comprising:
at least one processor; and
a memory medium, coupled to the at least one processor, that stores instructions executable by the at least one processor, which when executed by the at least one processor, cause the baseboard management controller to:
  determine that a mechanical switch of an information handling system has been actuated;
  provide, via a conductor of the mechanical switch, an electric charge to an element of a lid portion of a chassis of the information handling system;
  after providing the electric charge to the element of the lid portion of the chassis, permit the element of the lid portion of the chassis to discharge;
  determine that an amount of time has transpired after ceasing to provide the electric charge to the element of the lid portion of the chassis;

in response to determining that the amount of time has transpired, determine a voltage value of the discharge of the element of the lid portion of the chassis;

identify a data structure storing, for one or more voltage values, an associated chassis identification;

determine, based on the data structure, a chassis identification that corresponds to the determined voltage value; and configure at least a portion of the information handling system in response to the identification of the chassis.

17. The baseboard management controller of claim 16, wherein the instructions further cause the baseboard management controller to determine, based at least on the voltage, a capacitance value associated with the element of the lid portion of the chassis; and wherein determining the identification of the chassis from the plurality of chassis identifications based at least on the voltage value is further based at least on the capacitance value.

18. The baseboard management controller of claim 16, wherein the mechanical switch is an intrusion detection switch.

19. The baseboard management controller of claim 16, wherein the instructions further cause the baseboard management controller to determine an inventory of one or more components of the information handling system based at least on the identification of the chassis; and wherein, to configure the at least the portion of the information handling system, the instructions further cause the baseboard management controller to configure the information handling system to utilize the one or more components of the information handling system.

20. The baseboard management controller of claim 19, wherein the instructions further cause the baseboard management controller to configure the one or more components of the information handling system.

* * * * *